United States Patent
Wang

(10) Patent No.: US 12,395,848 B2
(45) Date of Patent: Aug. 19, 2025

(54) SYSTEM AND METHOD FOR SELECTING 5G N3IWF SERVER BASED ON CONTEXT-AWARE SELECTION CRITERIA

(71) Applicant: Samsung Electronics Co., Ltd., Suwon-si (KR)

(72) Inventor: Shu Wang, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 17/456,528

(22) Filed: Nov. 24, 2021

(65) Prior Publication Data

US 2023/0164569 A1 May 25, 2023

(51) Int. Cl.
| | |
|---|---|
| H04W 76/15 | (2018.01) |
| H04W 12/60 | (2021.01) |
| H04W 76/34 | (2018.01) |
| H04W 36/04 | (2009.01) |

(52) U.S. Cl.
CPC .................................. H04W 12/60 (2021.01)

(58) Field of Classification Search
CPC ...... H04W 12/60; H04W 88/06; H04W 48/48
See application file for complete search history.

(56) References Cited

U.S. PATENT DOCUMENTS

| | | | | |
|---|---|---|---|---|
| 6,301,516 | B1 * | 10/2001 | Ostrowski | G06Q 10/06395 700/109 |
| 6,535,775 | B1 * | 3/2003 | Bagepalli | G06F 30/00 700/109 |
| 10,638,400 | B1 * | 4/2020 | Xu | H04W 36/12 |
| 10,742,753 | B2 * | 8/2020 | Verkasalo | G06F 16/958 |
| 10,783,728 | B1 * | 9/2020 | Mhaske | G07C 9/29 |
| 10,979,355 | B2 | 4/2021 | Kiss et al. | |
| 11,031,638 | B2 * | 6/2021 | Lee | H01M 10/443 |
| 11,171,937 | B2 * | 11/2021 | Pande | G06F 21/316 |
| 11,201,945 | B1 * | 12/2021 | Combs | G06F 21/31 |

(Continued)

FOREIGN PATENT DOCUMENTS

| | | | | |
|---|---|---|---|---|
| EP | 3324685 | B1 * | 3/2021 | ........ H04W 52/0209 |
| EP | 3890404 | A1 | 10/2021 | |

(Continued)

OTHER PUBLICATIONS

International Search Report and Written Opinion of the International Searching Authority dated Aug. 11, 2022 in connection with International Patent Application No. PCT/KR2021/019019, 6 pages.

(Continued)

*Primary Examiner* — Venkat Perungavoor

(57) ABSTRACT

A method includes generating a decision matrix for selection of a particular Non-3GPP InterWorking Function (N3IWF) server among a plurality of N3IWF servers, the decision matrix having multiple criteria including multiple N3IWF capabilities. The method also includes dynamically weighting at least one of the multiple criteria in the decision matrix, based on one or more adjustment factors. The method further includes applying a multi-attribute decision making technique to the decision matrix to select the particular N3IWF server, among the plurality of N3IWF servers, for a mobile device to connect to in a 5G network.

20 Claims, 10 Drawing Sheets

(56) References Cited

U.S. PATENT DOCUMENTS

| | | | |
|---|---|---|---|
| 11,257,034 B1* | 2/2022 | Worley | G06Q 10/087 |
| 11,288,539 B1* | 3/2022 | Manyam | G06V 20/52 |
| 11,500,907 B2* | 11/2022 | Chang | G06F 16/90324 |
| 11,539,588 B2* | 12/2022 | Danait | H04L 41/142 |
| 11,551,160 B2* | 1/2023 | Handler | G06Q 30/0284 |
| 11,580,636 B2* | 2/2023 | Wang | G06T 3/40 |
| 11,615,064 B2* | 3/2023 | Naganna | H04L 67/535 |
| | | | 707/609 |
| 11,636,335 B2* | 4/2023 | Li | G06F 16/24575 |
| | | | 706/20 |
| 11,669,803 B1* | 6/2023 | Worley | G06Q 10/087 |
| | | | 705/28 |
| 11,765,608 B2* | 9/2023 | Yao | H04W 24/08 |
| | | | 370/252 |
| 11,874,745 B2* | 1/2024 | Tormasov | G06F 11/1461 |
| 11,947,651 B2* | 4/2024 | Douglas | G06F 21/32 |
| 12,182,830 B2* | 12/2024 | Kim | G06Q 20/227 |
| 12,198,075 B2* | 1/2025 | Cho | G06F 40/216 |
| 2015/0199616 A1* | 7/2015 | Rajendraprasad | G06N 20/00 |
| | | | 706/12 |
| 2015/0207691 A1* | 7/2015 | Price | H04L 67/5681 |
| | | | 709/217 |
| 2015/0269372 A1* | 9/2015 | Stevens | G06Q 20/40145 |
| | | | 726/28 |
| 2017/0078309 A1* | 3/2017 | Allen | G06F 16/285 |
| 2018/0189377 A1* | 7/2018 | Barnea | G06F 16/287 |
| 2020/0280843 A1 | 9/2020 | Foti et al. | |
| 2021/0058319 A1* | 2/2021 | Chu | H04L 45/1283 |
| 2021/0058826 A1* | 2/2021 | Mao | H04W 28/0933 |
| 2021/0110302 A1* | 4/2021 | Nam | G06N 5/01 |
| 2021/0117834 A1* | 4/2021 | Cho | G06N 5/048 |
| 2021/0168881 A1 | 6/2021 | Kedalagudde et al. | |
| 2021/0219140 A1* | 7/2021 | Salkintzis | H04W 12/08 |
| 2022/0171845 A1* | 6/2022 | Kumar | G06F 21/552 |
| 2022/0304054 A1* | 9/2022 | Yang | H04W 72/0446 |
| 2023/0020431 A1* | 1/2023 | Danait | H04L 41/122 |
| 2023/0119860 A1* | 4/2023 | Ma | G06Q 50/01 |
| | | | 382/181 |
| 2023/0214877 A1* | 7/2023 | Balakrishnan | G06Q 30/0244 |
| | | | 705/14.4 |
| 2023/0214941 A1* | 7/2023 | Chevalier | G06Q 10/1053 |
| | | | 705/319 |

FOREIGN PATENT DOCUMENTS

| | | | | |
|---|---|---|---|---|
| WO | WO-2005114340 A1 * | 12/2005 | | B65G 1/0478 |
| WO | WO-2019029046 A1 * | 2/2019 | | G06F 16/78 |
| WO | 2020041933 A1 | 3/2020 | | |
| WO | 2021069431 A1 | 4/2021 | | |
| WO | 2021160272 A1 | 8/2021 | | |
| WO | 2021225355 A1 | 11/2021 | | |

OTHER PUBLICATIONS

ETSI TS 124 502 V15.2.0 (Apr. 2019), Technical Specification; 5G; Access to the 3GPP 5G Core Network (5GCN) via non-3GPP access networks (3GPP TS 24.502 version 15.2.0 Release 15), Apr. 2019, 60 pages.

* cited by examiner

|  | Attribute Weight | 10 | 10 | 0 | 0 | ~502 |
|---|---|---|---|---|---|---|
|  |  | ATSSS | MOBIKE | Criteria_x | Cost | ~404 |
| 600 → | N3IWF server 1 | 0.577 | 0.707 | 0 | 0.707 | |
|  | N3IWF server 2 | 0 | 0.707 | 0 | 0.707 | |
|  | N3IWF server 3 | 0.577 | 0 | 0 | 0 | |
|  | N3IWF server n | 0.577 | 0 | 1 | 0 | |

WEIGHTING ⬇

|  | ATSSS | MOBIKE | Criteria_x | Cost ~404 |
|---|---|---|---|---|
| N3IWF server 1 | 5.77 | 7.07 | 0 | 0 |
| N3IWF server 2 | 0 | 7.07 | 0 | 0 |
| N3IWF server 3 | 5.77 | 0 | 0 | 0 |
| N3IWF server n | 5.77 | 0 | 0 | 0 |

| | ATSSS | MOBIKE | Criteria_x | Cost 404 | S* 802 |
|---|---|---|---|---|---|
| N3IWF server 1 | $(5.77-5.77)^2$ | $(7.07-7.07)^2$ | 0 | 0 | 0 |
| N3IWF server 2 | $(0-5.77)^2$ | $(7.07-7.07)^2$ | 0 | 0 | 5.77 |
| N3IWF server 3 | $(5.77-5.77)^2$ | $(0-7.07)^2$ | 0 | 0 | 7.07 |
| N3IWF server n | $(5.77-5.77)^2$ | $(0-7.07)^2$ | 0 | 0 | 7.07 |

| | ATSSS | MOBIKE | Criteria_x | Cost 404 | S* 902 |
|---|---|---|---|---|---|
| N3IWF server 1 | $(5.77-0)^2$ | $(7.07-0)^2$ | 0 | 0 | 9.12 |
| N3IWF server 2 | $(0-0)^2$ | $(7.07-0)^2$ | 0 | 0 | 7.07 |
| N3IWF server 3 | $(5.77-0)^2$ | $(0-0)^2$ | 0 | 0 | 5.77 |
| N3IWF server n | $(5.77-0)^2$ | $(0-0)^2$ | 0 | 0 | 5.77 |

SYSTEM AND METHOD FOR SELECTING 5G N3IWF SERVER BASED ON CONTEXT-AWARE SELECTION CRITERIA

TECHNICAL FIELD

This disclosure relates generally to communication between electronic devices. More specifically, this disclosure relates to a system and method for selecting a 5G N3IWF server based on context-aware selection criteria.

BACKGROUND

For 5G networks, a N3IWF (Non-3GPP InterWorking Function) server provides a secure gateway to the operator's 5G network for non-3GPP access. The N3IWF server is responsible for connecting an untrusted, non-3GPP access network (e.g., a Wi-Fi network) to the 5G core network. In typical implementations, the user equipment (UE) and the N3IWF server establish an IPSec tunnel, and the N3IWF server separately connects to the user plane and the control plane of the 5G core network through an N2 interface and an N3 interface, respectively. If the non-3GPP access network is a Wi-Fi network, the UE can access the carrier 5G core services via a UE-N3IWF secure connection. Supported services include, but not limited to, Voice over call, multimedia message service (MMS), short message service (SMS), carrier 5G applications, and the like.

SUMMARY

This disclosure provides a system and method for selecting a 5G N3IWF server based on context-aware selection criteria.

In a first embodiment, a method includes generating a decision matrix for selection of a particular N3IWF server among a plurality of N3IWF servers, the decision matrix having multiple criteria including multiple N3IWF capabilities. The method also includes dynamically weighting at least one of the multiple criteria in the decision matrix, based on one or more adjustment factors. The method further includes applying a multi-attribute decision making technique to the decision matrix to select the particular N3IWF server, among the plurality of N3IWF servers, for a mobile device to connect to in a 5G network.

In a second embodiment, an electronic device includes at least one memory configured to store instructions. The electronic device also includes a processor configured when executing the instructions to generate a decision matrix for selection of a particular N3IWF server among a plurality of N3IWF servers, the decision matrix having multiple criteria including multiple N3IWF capabilities; dynamically weight at least one of the multiple criteria in the decision matrix, based on one or more adjustment factors; and apply a multi-attribute decision making technique to the decision matrix to select the particular N3IWF server, among the plurality of N3IWF servers, for the electronic device to connect to in a 5G network.

In a third embodiment, a non-transitory computer readable medium contains computer readable program code that, when executed, causes at least one processor of an electronic device to generate a decision matrix for selection of a particular N3IWF server among a plurality of N3IWF servers, the decision matrix having multiple criteria including multiple N3IWF capabilities; dynamically weight at least one of the multiple criteria in the decision matrix, based on one or more adjustment factors; and apply a multi-attribute decision making technique to the decision matrix to select the particular N3IWF server, among the plurality of N3IWF servers, for the electronic device to connect to in a 5G network.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smart phone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIG. 7 illustrates an example of weighting the normalized decision matrix of FIG. 6 according to the disclosure;

FIG. 8 illustrates the determination of separation from an ideal solution for the weighted decision matrix of FIG. 7 according to this disclosure;

FIG. 9 illustrates the determination of separation from a negative solution for the weighted decision matrix of FIG. 7 according to this disclosure;

DETAILED DESCRIPTION

Figure 1:
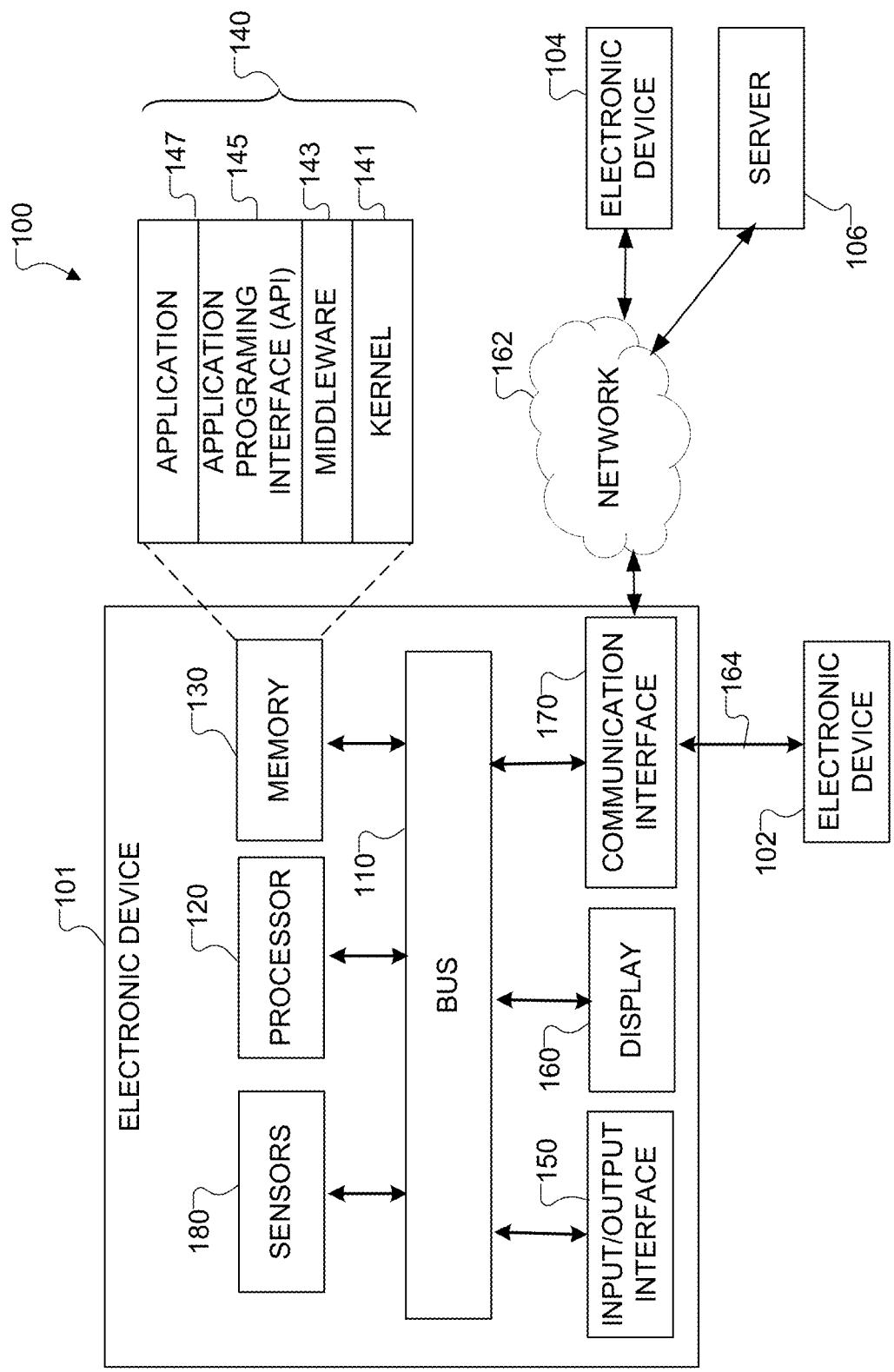
FIG. 1 illustrates an example network configuration according to this disclosure.

The figures discussed below and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

As discussed above, for 5G networks, a N3IWF server provides a secure gateway to the operator's 5G network for non-3GPP access. The N3IWF server is responsible for connecting an untrusted, non-3GPP access network (e.g., a Wi-Fi network) to the 5G core network. In typical implementations, the UE and the N3IWF server establish an IPSec tunnel, and the N3IWF server separately connects to the user plane and the control plane of the 5G core network through an N2 interface and an N3 interface, respectively. If the non-3GPP access network is a Wi-Fi network, the UE can access the carrier 5G core services via a UE-N3IWF secure connection. Supported services include, but not limited to, Voice over call, multimedia message service (MMS), short message service (SMS), carrier 5G applications, and the like.

In conventional 4G networks, the selection of the ePDG server selection by the UE is hardcoded based on carrier requirements. For example, the UE may select the first IP address from the DNS resolution of the ePDG Fully Qualified Domain Name (FQDN). With embedded SIMS (eSIMs) now being widely used, the UE may need to connect to different carriers (and sometimes to an unknown network).

In contrast to an ePDG server in 4G networks, N3IWF servers support 5G specific features, such as Access Traffic Steering, Switching and Splitting (ATSSS). ATSSS is an optional feature in 5G. In ATSSS, "Steering" refers to selecting the best connection to use (e.g., 5G versus Wi-Fi) for a data transmission. "Switching" refers to performing a handover (e.g., a handover between 5G and Wi-Fi) without service interruption. "Splitting" refers to the simultaneous use of 3GPP and non-3GPP connections for data traffic. ATSSS-capable 5G networks simultaneously support N3IWF-based, non-3GPP connections (e.g., Wi-Fi) and 5G 3GPP connections for a PDN.

Another optional 5G specific feature is Internet Key Exchange (IKEv2) Mobility and Multihoming Protocol (MOBIKE). MOBIKE allows the IP addresses associated with IKEv2 and tunnel mode IPSec Security Associations to change. This enables a peer host (e.g., a UE) to change its point of network attachment and use different interfaces without removing the existing IPSec tunnel.

In a typical 5G deployment, there may be multiple N3IWF servers, and each N3IWF may have different capabilities. Such capabilities may correspond to different carriers, different regions, or different feature roll outs within the same operator. For example, some N3IWF servers may support ATSSS, while other N3IWF servers may not support ATSSS. Some N3IWF servers may support MOBIKE, while other N3IWF servers may not support MOBIKE.

Additionally, each 5G-capable UE can also have different requirements or support capabilities for a N3IWF server. For example, if a UE has ATSSS supported apps or supports ATSSS for voice over Wi-Fi (VOWIFI) handovers, it is important to select a N3IWF server that supports ATSSS. Similarly, if the UE supports MOBIKE, the UE may require the N3IWF server to support MOBIKE. Thus, with the availability of N3IWF advanced features in 5G, a more intelligent N3IWF server selection approach is needed.

To address these and other issues, embodiments of this disclosure provide systems and methods for selecting a 5G N3IWF server based on context-aware selection criteria. The disclosed embodiments employ an intelligent N3IWF server selection process that considers features of the UE, personal context information of the mobile user, carrier requirements, and N3IWF server supported features to select the best (i.e., optimal) N3IWF server. Note that while some of the embodiments discussed below are described in the context of use for consumer electronic devices, but this is merely one example. It will be understood that the principles of this disclosure may be implemented in any number of other suitable contexts.

FIG. 1 illustrates an example network configuration 100 according to this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or a sensor 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, an active matrix OLED (AMOLED), a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 may be a wearable device or an electronic device 101—mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

Figure 2:
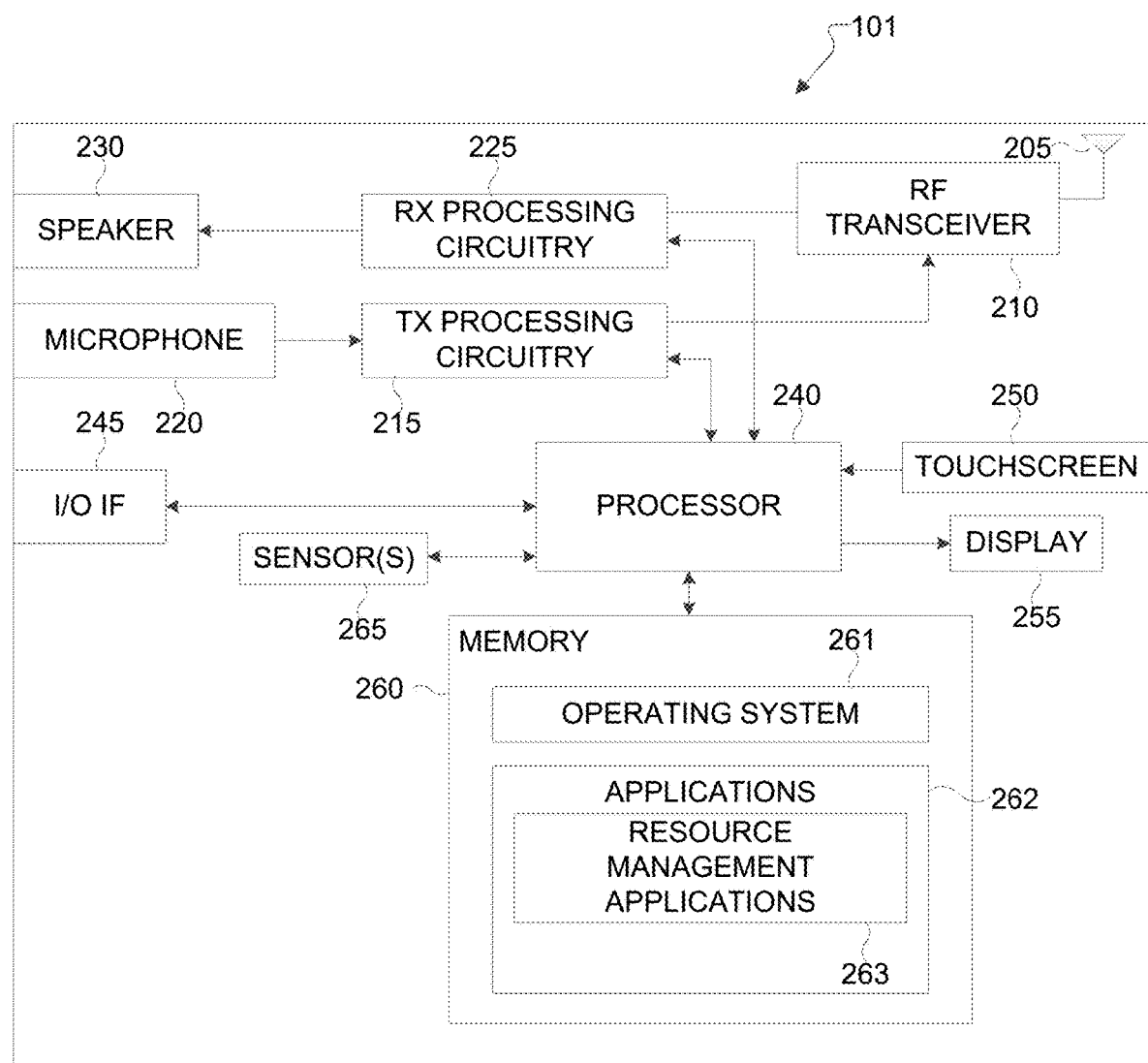
FIG. 2 illustrates an example electronic device according to this disclosure.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIG. 2 illustrates an example electronic device 101 according to this disclosure. The electronic device 101 could represent one or more of the electronic devices 101, 102, or 104 in FIG. 1. In some embodiments, the electronic device 101 can represent a 5G capable UE. As shown in FIG. 2, the electronic device 101 includes an antenna 205, a radio frequency (RF) transceiver 210, transmit (TX) processing circuitry 215, a microphone 220, and receive (RX) processing circuitry 225. The electronic device 101 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by another component in a system. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing.

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processors and execute the OS program 261 stored in the memory 260 in order to control the overall operation of the electronic device 101. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor 240 can execute a resource management application 263 for monitoring system resources. The processor 240 is also coupled to the I/O interface 245, which provides the electronic device 101 with the ability to connect to other devices such as laptop computers, handheld computers and other accessories, for example, a virtual reality (VR) headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the display 255. The operator of the electronic device 101 can use the input 250 (e.g., keypad, touchscreen, button etc.) to enter data into the electronic device 101. The display 255 may be an LCD, LED, OLED, AMOLED, MEMS, electronic paper, or other display capable of rendering text and/or at least limited graphics, such as from web sites.

The memory 260 is coupled to the processor 240. Part of the memory 260 could include a random access memory (RAM), and another part of the memory 260 could include a Flash memory or other read-only memory (ROM).

The electronic device 101 further includes one or more sensors 265 that can meter a physical quantity or detect an activation state of the electronic device 101 and convert metered or detected information into an electrical signal. For example, the sensor 265 may include any of the various sensors 180 discussed above.

Although FIG. 2 illustrates one example of an electronic device 101, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 101 configured as a mobile telephone or smart phone, electronic devices could be configured to operate as other types of mobile or stationary devices. In addition, as with computing and communication networks, electronic devices can come in a wide variety of configurations and FIG. 2 does not limit this disclosure to any particular electronic device.

Figure 3:
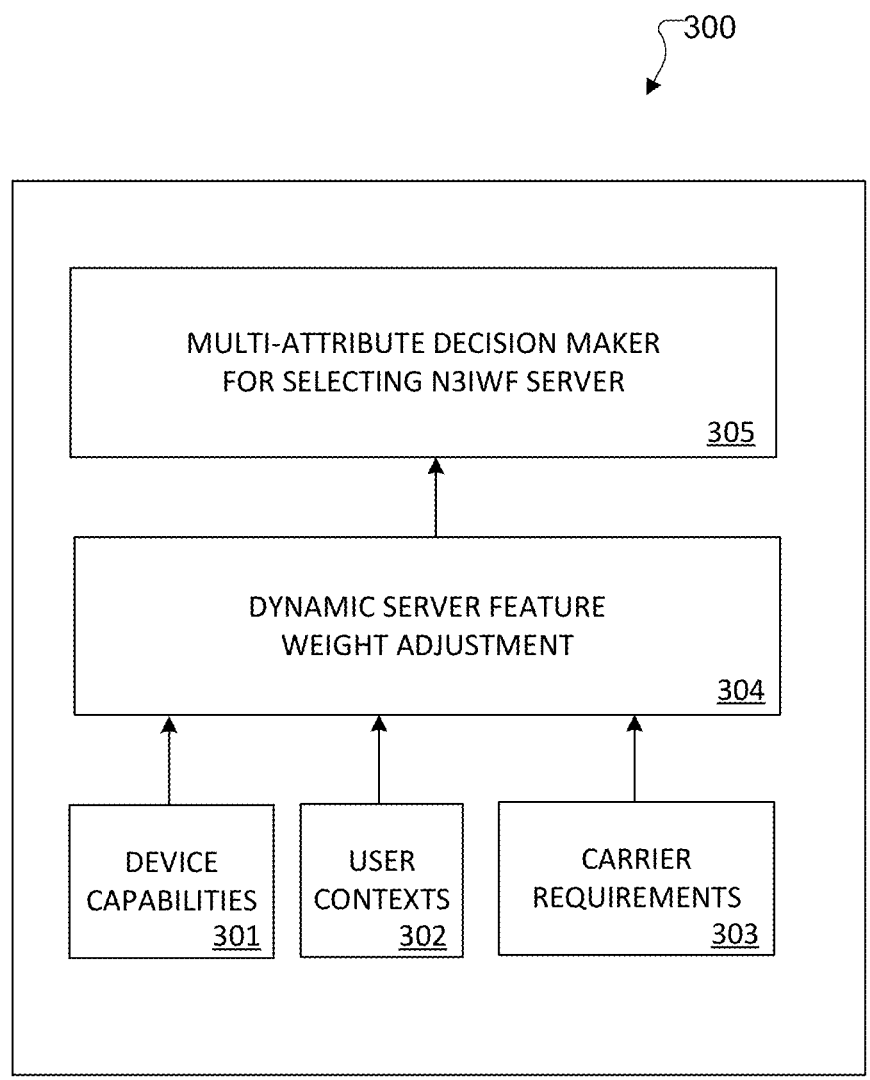
FIG. 3 illustrates an example framework in which a 5G N3IWF server can be selected based on context-aware selection criteria according to this disclosure.

FIG. 3 illustrates an example framework 300 in which a 5G N3IWF server can be selected based on context-aware selection criteria according to this disclosure. The framework 300 applies one or more multi-attribute decision making (MADM) algorithms for N3IWF server selection using multiple criteria. In some embodiments, the framework 300 enhances an existing MADM algorithm with context aware features to allow dynamic attribute importance weight adjustment in order to optimize N3IWF server selection based on user context, device capabilities, and carrier requirements, if available. For ease of explanation, the framework 300 is described as being implemented using one or more components of the electronic device 101 described above. In particular, the framework 300 may be implemented using a 5G capable UE. However, this is merely one example, and the framework 300 could be implemented using any other suitable device(s).

As shown in FIG. 3, using the framework 300, the electronic device 101 obtains one or more device capabilities 301, user contexts 302, and carrier requirements 303 for use as selection criteria in the N3IWF server selection. The device capabilities 301 indicate which features the electronic device 101 is capable of supporting. For example, if the electronic device 101 supports Dual SIM Dual Standby (DSDS), then the device capabilities 301 can include a MOBIKE attribute, since the electronic device 101 may need to use MOBIKE support in order to perform a cross SIM N3IWF connection in an active call scenario. As another example, if the electronic device 101 supports an ATSSS application, then the device capabilities 301 can include an ATSSS attribute. Of course, these examples are not limiting; the device capabilities 301 can include any other suitable device capability parameters, attributes, or indications.

The user contexts 302 indicate one or more patterns of a user of the electronic device 101 (i.e., the UE user). The user patterns can be associated with a time of day or time period within the day, location and movement information, user network selections, and the like. Over time, the electronic device 101 can learn the history and mobility patterns of the user. For example, the electronic device 101 can learn that the user always stays in the office from 5 pm to 8 pm on weekdays. As another example, the electronic device 101 can learn that the user typically connects to the same Wi-Fi access point (AP) while in the office. As yet another example, the electronic device 101 can learn what apps the user regularly uses on the electronic device 101. Of course, these examples are not limiting; the user contexts 302 can include any other suitable user context parameters or indications.

The carrier requirements 303 indicate whether or not a carrier requires certain features. In some embodiments, the carrier requirements 303 can be mandatory and the framework 300 can make the attribute weights (discussed in greater detail below) non-modifiable for the carrier requirements 303.

Figure 4:
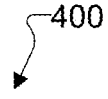
FIG. 4 illustrates an example N3IWF server selection decision matrix according to this disclosure.

Once the electronic device 101 obtains the device capabilities 301, user contexts 302, and carrier requirements 303, the electronic device 101 generates a N3IWF server selection decision matrix that can be applied to the N3IWF selection. FIG. 4 illustrates an example N3IWF server selection decision matrix 400 according to this disclosure. For ease of explanation, the decision matrix 400 is described as being used with the framework 300. However, this is merely one example, and the decision matrix 400 could be used in any other suitable context.

As shown in FIG. 4, the decision matrix 400 includes multiple rows, where each row is associated with one of multiple possible N3IWF servers 402 that the electronic device 101 can select for the N3IWF connection. In the decision matrix 400, the N3IWF servers 402 are identified as 1, 2, 3, . . . , n.

The decision matrix 400 also includes multiple columns, where each column represents one of multiple decision criteria 404 that the electronic device 101 may consider when selecting one of the N3IWF servers 402. The decision criteria 404 include various N3IWF capabilities and feature attributes that are relevant for the electronic device 101 deciding which N3IWF server 402 to select. In some embodiments, one or more of the decision criteria 404 can include one or more of the device capabilities 301 and carrier requirements 303. In the decision matrix 400, the decision criteria 404 include ATSSS, MOBIKE, criteria_x, and cost. ATSSS and MOBIKE represent whether or not the electronic device 101 supports ATSSS and MOBIKE. Criteria_x is simply shorthand for one or more other decision criteria 404 that may be part of the decision matrix 400. Cost represents a financial cost for N3IWF data, voice, or both. For example, for some carriers, N3IWF data and voice is free to the subscriber. However, for some carriers, N3IWF data and/or voice may have an associated cost or fee due to the subscriber's Wi-Fi related subscription plan.

For each combination of N3IWF server 402 and decision criteria 404, the decision matrix 400 includes a value. As shown in FIG. 4, the values are either 0 or 1. For ATSSS, MOBIKE, and Criteria_x, 0 can indicate that the feature is not supported by that N3IWF server 402, and 1 can indicate that the feature is supported. For cost, 0 can indicate that N3IWF is fee based for that N3IWF server 402, and 1 can indicate that N3IWF is free. Of course, these values are merely examples; other values and their indications are possible and within the scope of this disclosure.

Figure 5:
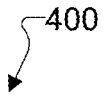
FIG. 5 illustrates the decision matrix of FIG. 4 with attribute weights assigned to each decision criterion according to this disclosure.

Returning to FIG. 3, once the decision matrix 400 is generated, the electronic device 101 can perform a dynamic server feature weight adjustment process 304 to dynamically adjust the importance of the decision criteria 404. Using the process 304, the electronic device 101 adjusts the importance of each decision criterion 404 by assigning an attribute weight to each decision criterion 404. For example, FIG. 5 illustrates the decision matrix 400 with attribute weights 502 assigned to each decision criterion 404. The attribute weights 502 are determined based on the device capabilities 301 (which can include app requirements), the user contexts 302, and the carrier requirements 303.

For example, based on the user contexts 302, if the user has a non-DSDS device, always stays in the office from 5 pm to 8 pm on weekdays, and always connects to the same Wi-Fi AP while in the office, then the electronic device 101 can determine that MOBIKE is not very important for this user, and the attribute weight 502 for MOBIKE can be set to a value representing low importance. On the other hand, if the device supports DSDS, then the electronic device 101 can determine that MOBIKE is important for this user, since the device may need to use MOBIKE support in order to perform a cross SIM N3IWF connection in an active call scenario. As another example, based on the carrier requirements 303, if a carrier requires that one or more features is mandatory, then the attribute weight 502 for an associated decision criterion 404 can be set to a value and made non-modifiable. As shown in FIG. 5, the attribute weights 502 are values between 0 and 10, where 0 indicates low importance, and 10 indicates high importance. Of course, these values are merely examples; other values and their indications are possible and within the scope of this disclosure.

After the electronic device 101 weights the decision criteria 404 using the process 304, the electronic device 101 can perform a multi-attribute decision making (MADM) algorithm 305 to select the best option for the N3IWF server 402. The electronic device 101 performs the MADM algorithm 305 to choose the optimal candidate that meets the multiple weighted decision criteria 404. Here, the optimal (or best) candidate is the candidate with the highest degree of satisfaction among the N3IWF servers 402 in terms of an evaluated objective based on the multiple weighted decision criteria 404. In some embodiments, the electronic device 101 uses a modified version of a Technique for Order of Preference by Similarity to Ideal Solution (TOPSIS) as the MADM algorithm 305. In some embodiments, the MADM algorithm 305 includes the following steps.

Step 1. The decision matrix 400 is normalized according to the following:

$$r_{ij} = x_{ij}/\text{sq root}(\text{sum}, i=1 \ldots m \text{ of } x_{ij}^2). \tag{1}$$

In Eqn. (1), i indicates the row number and j indicates the column number in the decision matrix 400, m is the number of rows in the decision matrix 400, and $X_{ij}$ is the element value at the ith row and the jth column of the decision matrix 400. The operation sq root (sum, i=1 . . . m of $x_{ij}^2$) means the square root of the sum $(x_{1j}^2 + x_{2j}^2 + x_{3j}^2 + x_{mj}^2)$.

Figure 6:
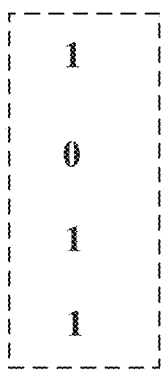
FIG. 6 illustrates an example of normalizing the decision matrix of FIG. 4 according to this disclosure.
Figure 6:
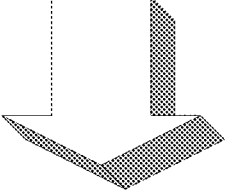

For example, FIG. 6 illustrates an example of normalizing the decision matrix 400 according to this disclosure. In FIG. 6, the first column of the decision matrix 400 is indicated with a dashed line. The first column of the decision matrix 400 has the following values: $X_{11}=1$, $X_{21}=0$, $X_{31}=1$, $X_{41}=1$. Using Eqn. (1), the normalized value for $X_{11}$ is calculated as:

$$\begin{aligned} r_{11} &= X_{11}/\text{sq root}\left(X_{11}^2 + X_{21}^2 + X_{31}^2 + X_{41}^2\right) \\ &= 1/\text{sq root}\left(1^2 + 0^2 + 1^2 + 1^2\right) \end{aligned} \tag{2}$$

-continued $$= 1/\text{sq root }(3)$$
$$= 1/1.732$$
$$= 0.577.$$

In FIG. 6, the normalized decision matrix 600 is obtained after normalization of the decision matrix 400.

Step 2. The normalized decision matrix 600 is weighted to obtain a weighted decision matrix. The electronic device 101 can weight each element in the normalized decision matrix 600 by multiplying the element value by the corresponding attribute weight 502. For example, FIG. 7 illustrates an example of weighting the normalized decision matrix 600 according to the disclosure. In FIG. 7, each element in each column of the normalized decision matrix 600 is multiplied by the corresponding attribute weight 502 for that column. In FIG. 7, the weighted decision matrix 700 is obtained after weighting the normalized decision matrix 600.

Step 3. The ideal solution A* and the negative solution A⁻ are obtained from the weighted decision matrix 700. The ideal solution A* is the set of maximum values for the set of decision criteria 404. For example, in the weighted decision matrix 700, the maximum value for the ATSSS decision criterion 404 is 5.77. The maximum value for the MOBIKE decision criterion 404 is 7.07. The maximum value for the Criteria_x decision criterion 404 is 0. And the maximum value for the cost decision criterion 404 is 0. Thus, the ideal solution A* for the weighted decision matrix 700 is A*=(5.77, 7.07, 0, 0).

The negative solution A⁻ is the set of minimum values for the set of decision criteria 404. For example, in the weighted decision matrix 700, the minimum value for the ATSSS decision criterion 404 is 0. The minimum value for the MOBIKE decision criterion 404 is 0. The minimum value for the Criteria_x decision criterion 404 is 0. And the minimum value for the cost decision criterion 404 is 0. Thus, the negative solution A⁻ for the weighted decision matrix 700 is A⁻=(0, 0, 0, 0).

Step 4. The separation S* of the weighted decision matrix 700 from the ideal solution A* is determined. The determination is made on a row by row basis using the weighted decision matrix 700. In some embodiments, the separation S* is determined using the following:

$$S^*=\text{sq root}(\text{sum of squares for } j=1 \ldots n \text{ of } (r_{ij}-A^*)). \tag{3}$$

Stated differently, Eqn. (3) can also be expressed as the following:

$$S^*=\text{sq root}((r_{i1}-A^*)^2+(r_{i2}-A^*)^2(r_{i3}-A^*)^2+\ldots+(r_{in}-A^*)^2). \tag{4}$$

In Eqns. (3) and (4), n represents the number of columns in the weighted decision matrix 700. FIG. 8 illustrates the determination of the separation 802 S* for the weighted decision matrix 700 according to this disclosure. For the first row of the weighted decision matrix 700:

First row, $S_1^*$=sq root $((5.77-5.77)^2+(7.07-7.07)^2+0+0)=0$.

For the second row, $S_2^*$=sq root $((0-5.77)^2+(7.07-7.07)^2+0+0)=5.77$.

For the third row, $S_3^*$=sq root $((5.77-5.77)^2+(0-7.07)^2+0+0)=7.07$.

For the fourth row, $S_4^*$=sq root $((5.77-5.77)^2+(0-7.07)^2+0+0)=7.07$.

Thus, the separation 802 S* from the ideal solution is S*=(0, 5.77, 7.07, 7.07).

Step 5. The separation S⁻ of the weighted decision matrix 700 from the negative solution A⁻ is determined. The determination is made on a row by row basis using the weighted decision matrix 700. In some embodiments, the separation S⁻ is determined using the following:

$$S^-=\text{sq root }(\text{sum of squares for } j=1 \ldots n \text{ of } (r_{ij}-A^-)). \tag{5}$$

Stated differently, Eqn. (5) can also be expressed as the following:

$$S^-=\text{sq root}((r_{i1}-A^-)^2+(r_{i2}-A^-)^2+(r_{i3}-A^-)^2+\ldots+(r_{in}-A^-)^2). \tag{6}$$

FIG. 9 illustrates the determination of the separation 902 S⁻ for the weighted decision matrix 700 according to this disclosure. For the first row of the weighted decision matrix 700:

First row $S_1^-$=sq root $((5.77-0)^2+(7.07-0)^2+0+0)=9.12$.

For the 2nd row $S_2^-$=sq root $((0-0)^2+(7.07-0)^2+0+0)=7.07$.

For the 3rd row $S_3^-$=sq root $((5.77-0)^2+(0-0)^2+0+0)=5.77$.

For the $4^{th}$ row $S_4^-$=sq root $((5.77-0)^2+(0-0)^2+0+0)=5.77$.

Thus, the separation 902 S⁻ from the ideal solution is S⁻=(9.12, 7.07, 5.77, 5.77).

Figure 10:
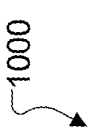
FIG. 10 illustrates an example matrix in which relative closeness is determined according to this disclosure.

Step 6. The relative closeness to the ideal solution is determined using S⁻/(S*+S⁻), where S⁻ is the separation 902 from the negative solution and S* is the separation 802 from the ideal solution. FIG. 10 illustrates an example matrix 1000 in which the relative closeness 1002 is determined from the separation 802 and the separation 902 for each N3IWF server 402. In the matrix 1000, the N3IWF server 1 has a relative closeness value of S⁻/(S*+S⁻)=1, which is the maximum value among the N3IWF servers 402. Thus, the electronic device 101 can select N3IWF server 1 as the optimal server for the N3IWF connection.

As described herein, the framework 300 allows the electronic device 101 to not only consider the capabilities of the N3IWF servers, but also provides flexibility for adjusting the importance of selection criteria (using the weight adjustment process 304) per device capabilities 301, user contexts 302, and carrier requirements 303. This enables the UE to have a consistent technique for N3IWF server selection. That is, there is no need to customize the selection process for different carriers. The disclosed embodiments enable the UE to have flexibility in supporting various carriers. This is becoming more important as the use of eSIMs increases, and supporting UEs will need to connect to different carriers.

Although FIGS. 3 through 10 illustrate example details of a framework 300 in which a 5G N3IWF server can be selected based on context-aware selection criteria, various changes may be made to FIGS. 3 through 10. For example, the framework 300 could include any number of each component in any suitable arrangement. In general, computing and communication systems come in a wide variety of configurations, and FIG. 3 does not limit the scope of this disclosure to any particular configuration. Also, various operations in FIGS. 3 through 10 could overlap, occur in parallel, occur in a different order, or occur any number of times. In addition, the specific operations shown in FIGS. 3 through 10 are examples only, and other techniques (including other MADM algorithms that are not based on TOPSIS) could be used to perform each of the operations shown in these figures.

It should be noted that the various functions and operations shown and described above with respect to FIGS. 3 through 10 can be implemented in the electronic device 101 in any suitable manner. For example, in some embodiments, at least some of the functions and operations can be implemented or supported using one or more software applications or other software instructions that are executed by the processor(s) 120, 240 of the electronic device 101. In other embodiments, at least some of the functions and operations can be implemented or supported using dedicated hardware components. In general, the functions and operations can be performed using any suitable hardware or any suitable combination of hardware and software/firmware instructions.

Figure 11:
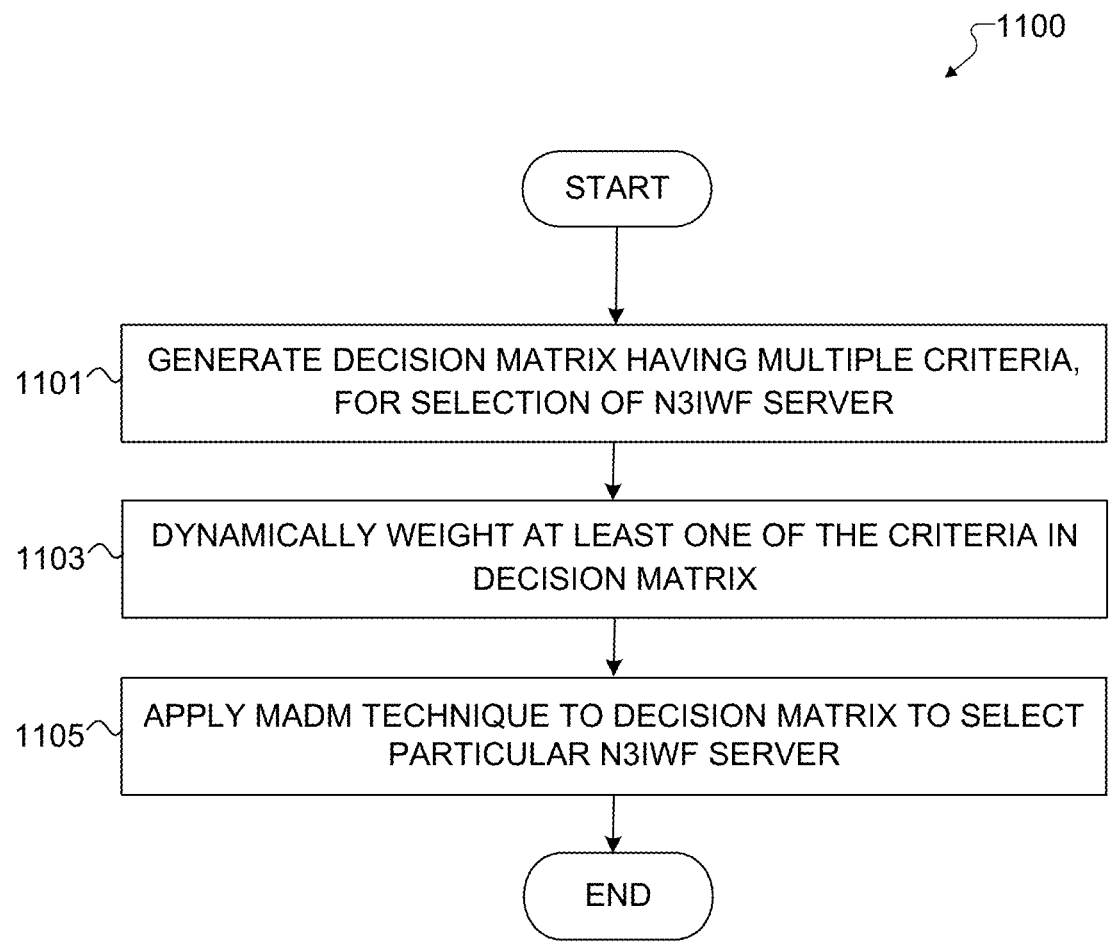
FIG. 11 illustrates an example method for selecting a 5G N3IWF server based on context-aware selection criteria according to this disclosure.

FIG. 11 illustrates an example method 1100 for selecting a 5G N3IWF server based on context-aware selection criteria according to this disclosure. For ease of explanation, the method 1100 shown in FIG. 11 is described as involving the framework 300 shown in FIGS. 3 through 10. The method 1100 may be performed by an electronic device, such as the electronic device 101 of FIG. 1. However, the method 1100 could involve any other suitable framework and be performed by any suitable device or system without departing from the scope of this disclosure.

At operation 1101, the electronic device 101 generates a decision matrix for selection of a particular N3IWF server among a plurality of N3IWF servers, where the decision matrix has multiple criteria including multiple N3IWF capabilities. This can include, for example, the electronic device 101 generating the decision matrix 400 with multiple decision criteria 404.

At operation 1103, the electronic device 101 dynamically weights at least one of the multiple criteria in the decision matrix, based on one or more adjustment factors. This can include, for example, the electronic device 101 performing the dynamic server feature weight adjustment process 304 to assign attribute weights 502 to each decision criterion 404.

At operation 1105, the electronic device 101 applies a multi-attribute decision making technique to the decision matrix to select the particular N3IWF server, among the plurality of N3IWF servers, for a mobile device to connect to in a 5G network. This can include, for example, the electronic device 101 performing the MADM algorithm 305, such as shown in FIGS. 6 through 10, to select the particular N3IWF server 402.

Although FIG. 11 illustrates one example of a method 1100 for selecting a 5G N3IWF server based on context-aware selection criteria according to this disclosure, various changes can be made to FIG. 11. For example, various steps in FIG. 11 could overlap, occur in parallel, occur serially, occur in a different order, or occur any number of times. Also, the steps of the method 1100 could be implemented in any suitable manner, such as entirely within the electronic device 101 or using a combination of devices. For instance, the electronic device 101 could collect data and provide the data to a server 106, which could then process the data and generate any suitable output.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
generating a decision matrix for selection of a particular Non-3GPP InterWorking Function (N3IWF) server among a plurality of N3IWF servers, the decision matrix comprising initial values associated with multiple criteria, the multiple criteria including multiple N3IWF capabilities;
dynamically weighting at least one of the multiple criteria in the decision matrix based on one or more adjustment factors, wherein dynamically weighting the at least one of the multiple criteria comprises multiplying at least one of the initial values of the decision matrix by an adjustment factor of the one or more adjustment factors to obtain a weighted decision matrix, and wherein the adjustment factor of the one or more adjustment factors is a dynamically determined adjustment factor based on a user context indicating a behavior pattern of a user of a mobile device, the behavior pattern of the user learned by the mobile device over time; and
applying a multi-attribute decision making technique to the weighted decision matrix to select the particular N3IWF server among the plurality of N3IWF servers for the mobile device to connect to in a 5G network.

2. The method of claim 1, wherein the user context is determined at least in part by the mobile device.

3. The method of claim 2, wherein the behavior pattern of the user is associated with one or more of:
a time of day or a time period during the day of a user behavior associated with an increased weighting value for the at least one of the multiple criteria;
a user location; or
a user selection of a network connection of the mobile device.

4. The method of claim 1, wherein the one or more adjustment factors are based on one or more capabilities of the mobile device.

5. The method of claim 4, wherein the one or more capabilities of the mobile device comprise at least one of Access Traffic Steering, Switching, and Splitting (ATSSS), Internet Key Exchange (IKEv2) Mobility and Multihoming Protocol (MOBIKE), or Dual SIM Dual Standby (DSDS).

6. The method of claim 1, wherein the one or more adjustment factors further are based on one or more requirements of a carrier of the 5G network.

7. The method of claim 1, wherein applying the multi-attribute decision making technique to the weighted decision matrix to select the particular N3IWF server comprises:
determining an ideal solution from the weighted decision matrix;
determining a relative closeness of each of the N3IWF servers to the ideal solution; and
selecting the N3IWF server with a maximum relative closeness as the particular N3IWF server.

8. An electronic device comprising:
at least one memory configured to store instructions; and
at least one processor configured when executing the instructions to:
generate a decision matrix for selection of a particular Non-3GPP InterWorking Function (N3IWF) server among a plurality of N3IWF servers, the decision matrix having comprising initial values associated with multiple criteria, the multiple criteria including multiple N3IWF capabilities;
dynamically weight at least one of the multiple criteria in the decision matrix based on one or more adjustment factors, wherein, to dynamically weight the at least one of the multiple criteria, the at least one processor is configured when executing the instructions to multiply at least one of the initial values of the decision matrix by an adjustment factor of the one or more adjustment factors to obtain a weighted decision matrix, and wherein the adjustment factor of the one or more adjustment factors is a dynamically determined adjustment factor based on a user context indicating a behavior pattern of a user of the electronic device, the behavior pattern of the user learned by the electronic device over time; and apply a multi-attribute decision making technique to the weighted decision matrix to select the particular N3IWF server among the plurality of N3IWF servers for the electronic device to connect to in a 5G network.

9. The electronic device of claim 8, wherein the at least one processor is further configured when executing the instructions to at least partially determine the user context.

10. The electronic device of claim 9, wherein the behavior pattern of the user is associated with one or more of:
 a time of day or a time period during the day of a user behavior associated with an increased weighting value for the at least one of the multiple criteria;
 a user location; or
 a user selection of a network connection of the electronic device.

11. The electronic device of claim 8, wherein the one or more adjustment factors are based on one or more capabilities of the electronic device.

12. The electronic device of claim 11, wherein the one or more capabilities of the electronic device comprise at least one of Access Traffic Steering, Switching, and Splitting (ATSSS), Internet Key Exchange (IKEv2) Mobility and Multihoming Protocol (MOBIKE), or Dual SIM Dual Standby (DSDS).

13. The electronic device of claim 8, wherein the one or more adjustment factors are based on one or more requirements of a carrier of the 5G network.

14. The electronic device of claim 8, wherein, to apply the multi-attribute decision making technique to the weighted decision matrix to select the particular N3IWF server, the at least one processor is configured to:
 determine an ideal solution from the weighted decision matrix;
 determine a relative closeness of each of the N3IWF servers to the ideal solution; and
 select the N3IWF server with a maximum relative closeness as the particular N3IWF server.

15. A non-transitory computer readable medium containing computer readable program code that, when executed, causes at least one processor of an electronic device to:
 generate a decision matrix for selection of a particular Non-3GPP InterWorking Function (N3IWF) server among a plurality of N3IWF servers, the decision matrix comprising initial values associated with multiple criteria, the multiple criteria including multiple N3IWF capabilities;
 dynamically weight at least one of the multiple criteria in the decision matrix based on one or more adjustment factors, wherein the computer readable program code that when executed causes the at least one processor to dynamically weight the at least one of the multiple criteria comprises computer readable program code that when executed causes the at least one processor to multiply at least one of the initial values of the decision matrix by an adjustment factor of the one or more adjustment factors to obtain a weighted decision matrix, and wherein the adjustment factor of the one or more adjustment factors is a dynamically determined adjustment factor based on a user context indicating a behavior pattern of a user of the electronic device, the behavior pattern of the user learned by the electronic device over time; and apply a multi-attribute decision making technique to the weighted decision matrix to select the particular N3IWF server among the plurality of N3IWF servers for the electronic device to connect to in a 5G network.

16. The non-transitory computer readable medium of claim 15, wherein the computer readable program code when executed further causes the at least one processor to at least partially determine the user context.

17. The non-transitory computer readable medium of claim 16, wherein the behavior pattern of the user is associated with one or more of:
 a time of day or a time period during the day of a user behavior associated with an increased weighting value for the at least one of the multiple criteria;
 a user location; or
 a user selection of a network connection of the electronic device.

18. The non-transitory computer readable medium of claim 15, wherein the one or more adjustment factors are based on one or more capabilities of the electronic device.

19. The non-transitory computer readable medium of claim 18, wherein the one or more capabilities of the electronic device comprise at least one of Access Traffic Steering, Switching, and Splitting (ATSSS), Internet Key Exchange (IKEv2) Mobility and Multihoming Protocol (MOBIKE), or Dual SIM Dual Standby (DSDS).

20. The non-transitory computer readable medium of claim 15, wherein the computer readable program code that when executed causes the at least one processor to apply the multi-attribute decision making technique to the weighted decision matrix to select the particular N3IWF server comprises:
 computer readable program code that when executed causes the at least one processor to:
  determine an ideal solution from the weighted decision matrix;
  determine a relative closeness of each of the N3IWF servers to the ideal solution; and
  select the N3IWF server with a maximum relative closeness as the particular N3IWF server.

* * * * *